US010202696B2

(12) United States Patent
Kawabata et al.

(10) Patent No.: US 10,202,696 B2
(45) Date of Patent: Feb. 12, 2019

(54) ELECTROCHEMICAL HYDROGEN PUMP

(71) Applicant: Panasonic Intellectual Property Management Co., Ltd., Osaka (JP)

(72) Inventors: Norihiko Kawabata, Osaka (JP); Kazuya Usirokawa, Osaka (JP); Shinji Yoshino, Hyogo (JP); Hidenobu Wakita, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 46 days.

(21) Appl. No.: 15/497,184

(22) Filed: Apr. 25, 2017

(65) Prior Publication Data

US 2017/0350021 A1   Dec. 7, 2017

(30) Foreign Application Priority Data

Jun. 6, 2016 (JP) .................................. 2016-112330
Jan. 11, 2017 (JP) .................................. 2017-002246

(51) Int. Cl.
*H01M 8/06* (2016.01)
*H01M 8/04* (2016.01)
(Continued)

(52) U.S. Cl.
CPC ............. *C25B 1/02* (2013.01); *B01D 53/22* (2013.01); *B01D 53/326* (2013.01); *B01D 63/00* (2013.01); *C25B 9/18* (2013.01); *H01M 8/04201* (2013.01); *H01M 8/0618* (2013.01); *H01M 8/0681* (2013.01); *B01D 2257/108* (2013.01)

(58) Field of Classification Search
None
See application file for complete search history.

(56) References Cited

U.S. PATENT DOCUMENTS

| 2011/0081591 A1 | 4/2011 | Scherer et al. |
| 2013/0177832 A1 | 7/2013 | Tsubosaka et al. |
| 2016/0168730 A1 | 6/2016 | Watanabe |

FOREIGN PATENT DOCUMENTS

| EP | 1296394 A1 * | 3/2003 | .......... H01M 8/0213 |
| EP | 1296394 A1 | 3/2003 | |

(Continued)

OTHER PUBLICATIONS

The Extended European Search Report dated Jun. 23, 2017 for the related European Patent Application No. 17168664.5.

*Primary Examiner* — Daniel S Gatewood
(74) *Attorney, Agent, or Firm* — Panasonic IP Management; Kerry S. Culpepper

(57) ABSTRACT

Provided is an electromechanical hydrogen pump, including: (i) an electrolyte membrane; (ii) an anode electrode layer and an anode diffusion layer that are provided at one side of the electrolyte membrane; (iii) a cathode electrode layer and a cathode diffusion layer that are provided at the other side of the electrolyte membrane; (iv) an anode seal that has openings each surrounding the anode diffusion layer; (v) a cathode seal that has openings each surrounding the cathode diffusion layer; (vi) an anode separator that is placed on an outer side of the anode diffusion layer; and (vii) a cathode separator that is placed on an outer side of the cathode diffusion layer, wherein no spaces are provided between the anode diffusion layer and the anode seal or between the cathode diffusion layer and the cathode seal.

6 Claims, 13 Drawing Sheets

(51) Int. Cl.
*C25B 1/02* (2006.01)
*C25B 9/18* (2006.01)
*B01D 53/22* (2006.01)
*B01D 63/00* (2006.01)
*H01M 8/04082* (2016.01)
*H01M 8/0612* (2016.01)
*B01D 53/32* (2006.01)
*H01M 8/0662* (2016.01)

(56) References Cited

FOREIGN PATENT DOCUMENTS

| | | |
|---|---|---|
| JP | 2005-079059 A | 3/2005 |
| WO | 2015/020065 | 2/2015 |

* cited by examiner

ELECTROCHEMICAL HYDROGEN PUMP

TECHNICAL FIELD

The technical field relates to an electrochemical hydrogen pump. In particular, the technical field relates to an electrochemical hydrogen pump for compressing a hydrogen gas.

BACKGROUND

Household fuel cells using hydrogen as fuels have become popular along with progress in their development. Furthermore, in recent years, fuel cell vehicles utilizing hydrogen as fuels have eventually been mass-produced and become commercially available in the same manner as household fuel cells. However, compared with household fuel cells for which existing city-gas and commercial-power-supply networks can be utilized, hydrogen infrastructures are indispensable for such fuel cell vehicles.

Therefore, it would be required that the number of hydrogen-filling stations serving as hydrogen infrastructures is expanded to further expand and popularize fuel cell vehicles in the days ahead. However, large-scale facilities and sites are required to build current hydrogen-filling stations, and thus, huge investments are required. This has been a major problem that remains to be solved in order to popularize fuel cell vehicles.

In order to cope with such a situation, development of an inexpensive compact, small-sized, household hydrogen-filling apparatus that serves as an alternative to a large-scale hydrogen-filling station has been expected. The most important issue for development of such a small-sized household hydrogen-filling apparatus is to develop a hydrogen compressor, and attention is currently focused on electrochemical hydrogen pumps that make it possible to electrochemically raise pressure of a hydrogen gas.

Compared with conventional mechanical hydrogen compressors, electrochemical hydrogen pumps have many merits. For example, they are compact and highly efficiently functional, they require little maintenance since they do not have any mechanically-operating parts, and cause almost no noise. Therefore, the development of commercially-viable electrochemical hydrogen pumps has eagerly been anticipated.

Currently, as one system that is expected to serve as a small-sized hydrogen-filling apparatus, a technique in which a hydrogen gas produced by use of a fuel-reforming device for household fuel cells is electrochemically compressed by use of an electrochemical hydrogen pump when the operation of the fuel cell is suspended can be mentioned. According to such an electrochemical hydrogen pump, besides the above-mentioned merits, the concentration of hydrogen that has been produced by use of the fuel-reforming device and that would be 75% at the highest can be reformed to a 100% hydrogen gas, and the hydrogen gas can be pressurized to an extreme pressure that makes it possible to fill the hydrogen gas into a fuel cell vehicle.

Moreover, the structure of the electrochemical hydrogen pump is almost the same as a structure of a power-generation stack in a household fuel cell. A major difference between them is that, in contrast to eh anode side to which a low-pressure hydrogen gas is supplied, the pressure at the cathode-side needs to be equal to or higher than the extreme pressure that makes it possible to fill the hydrogen gas into the fuel cell vehicle, and therefore, a specific structure for supporting an electrolyte membrane present between both the electrode layers is required.

A structure of a power-generated stack 1 in a conventional fuel cell is shown in FIG. 1. In FIG. 1, an electrolyte membrane 2, on both surfaces of which an anode electrode layer 3 and a cathode electrode layer 4 are formed, is sandwiched between an anode diffusion layer 4 and a cathode diffusion layer 6, the resulting stack is further sandwiched between an anode separator 7 and a cathode separator 8, the resulting stack is further sandwiched between an anode insulation plate 11 and a cathode insulation plate 12, and then, the resulting stack is fixed by bolts 13 and nuts 14.

Furthermore, an anode seal 9 and a cathode seal 10 are attached onto the circumferences of the anode diffusion layer 5 and the cathode diffusion layer 6, respectively, to prevent the gas from leaking to the outside. When the power-generation stack 1 in the fuel cell is used as a hydrogen pump, an anode inlet 15 is used for supplying a low-pressure hydrogen gas to the anode side of the power-generation stack 1, an anode outlet 16 is used for recovering an excess low-pressure hydrogen gas from the anode side, and a cathode inlet 17 is used for retrieving a high-pressure hydrogen gas from the cathode side of the power-generation stack 1. However, a cathode inlet 18 is not used, and therefore, is sealed. By using the inlets and the outlets in such a manner, a low-pressure hydrogen gas is supplied to the power generation stack 1 through the anode inlet 15, and voltage is applied to the stack between the anode separator 7 and the cathode separator 8 by a voltage-applying unit 19 in a state where the low-pressure hydrogen gas is flowed through anode flow channels 7a. As a result, hydrogen is dissociated into protons and electrons at the anode electrode layer 3, as shown in Formula 1.

$$\text{Anode electrode layer:} H_2(\text{low-pressure}) \rightarrow 2H^+ + 2e^- \quad \text{(Formula 1)}$$

The protons dissociated at the anode electrode layer 3 move to the electrolyte membrane 2 while entraining water molecules. Meanwhile, the electrons pass through the anode diffusion layer 5 and the anode separator 7, and move to the cathode separator 8, the cathode diffusion layer 6, and, eventually, the cathode electrode layer 4, through a voltage-applying unit 19. At the cathode electrode layer side, a reduction is taken place between the protons that have passed through the electrolyte membrane 2 and the electrons that has been moved from the cathode diffusion layer 6, and thus, hydrogen is produced. In that case, if the cathode inlet 17 is closed, the pressure of the hydrogen gas within the cathode flow channels 8b is increased, and thus, a high-pressure hydrogen gas is generated.

$$\text{Cathode electrode layer:} 2H^+ + 2e^- \rightarrow H_2(\text{high-pressure}) \quad \text{(Formula 2)}$$

In this case, a relationship among a pressure P1 of the hydrogen gas at the anode side, a pressure P2 of the hydrogen gas at the cathode side, and a voltage E is shown by Formula. 3 below.

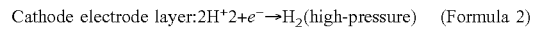

$$E = (RT/2F)\ln(P2/P1) + ir \quad \text{(Formula 3)}$$

in Formula 3, R represents the gas constant (8.3145 J/K·mol), T refers to a temperature (K) of the cell, F refers to the Faraday constant (96485 C/mol), P2 refers to the pressure of the hydrogen gas at the cathode side, P1 refers to the pressure of the hydrogen gas at the anode side, i refers to a current density (A/cm$^2$), and r refers to a cell resistance (Ω·cm$^2$).

As apparent from Formula 3, it is understood that, when the voltage is increased, the pressure P2 of the hydrogen gas at the cathode side will increase.

However, it is required that an anode space 20 and a cathode-side space 21 are formed between the anode diffusion layer 5 and the anode seal 9, and between the cathode diffusion layer 6 and the cathode seal 10, respectively, in order to makes it possible to assemble these components without causing any problems.

That is, in order to embed a disk-shaped anode diffusion layer 5 having a diameter ($\varphi$) d shown in the perspective view of FIG. 2A into a hole (opening) of a ring-shaped anode seal 9 shown in the perspective view of FIG. 2B where the inner diameter ($\varphi$) of the hole (opening) is referred to by reference symbol D, it is required that the inner diameter D is larger than the diameter d. Hence, after embedding of the anode diffusion layer 5 into the anode seal 9, the anode-side space 20 having a width $\delta$ is generated as shown in FIG. 3. Additionally, the width $\delta$ of the anode-side space 20 is about half a difference between the diameter d and the inner diameter D. For example, when the diameter d of the anode diffusion layer 5 is 100 mm, the inner diameter D of the anode seal 9 is typical designed such that the width $\delta$ of the anode-side space 20 becomes about 0.1 mm.

This is because, when the difference between diameter d and the inner diameter D is designed to be excessively small, the above-mentioned length relationship between the diameter d and the inner diameter D is reversed due to manufacturing variations in dimensions of the anode diffusion layer 5 and the anode seal 9, and there would be cases where it becomes impossible to embed the anode diffusion layer 5 into the hole (opening) of the anode seal 9. Additionally, it would be considered that the produced anode diffusion layer 5 and the anode seal 9 may be subjected to a dimension-inspection process, and only acceptable materials may be used. However, if such a process is conducted, a problem in which yields of anode diffusion layers 5 and the anode seals 9 would be decreased and costs accordingly increase will arise. Therefore, it is required that an anode-side space 20 having a width of about 0.1 mm is formed between the anode diffusion layer 5 and the anode seal 9.

The same shall apply to the cathode diffusion layer 6 and the cathode seal 10.

When the power generation stack 1 of the fuel cell having the anode-side space 20 and the cathode-side space 21 as described above is used as a hydrogen pump to pressurize the hydrogen gas, the electrolyte membrane 2 is pressed toward the direction from the high-pressure side (cathode side) to the low-pressure side (anode side) due to the pressure of the hydrogen gas applied to the cathode-side space 21, as the pressure at the high-pressure side is increased. That is, the electrolyte membrane 2 is deformed so as to penetrate into the anode-side space 20 at the low-pressure side. If this deformation becomes excessive, cracks will be caused in the electrolyte membrane 2, and will eventually result in breakage thereof.

Hence, a pressure to which a hydrogen gas can be pressurized by using a power-generation stack 1 of a general fuel cell as a hydrogen pump is not very high, and it has been reported that such a power generation stack 1 is not completely effective at filling hydrogen into a fuel ceil vehicle. To solve this problem, adoption of a structure for supporting an electrolyte membrane has been proposed in cases where such a general power-generation stack is used as a hydrogen pump, so as not to cause breakage of the electrolyte membrane even if a substantial difference in pressures is present between the high-pressure side and the low-pressure side (WO2015/020065).

A schematic cross-sectional view of an electrochemical hydrogen pump 22 disclosed in WO2015/020065 is shown in FIG. 4. According to the disclosure, the electrochemical hydrogen pump 22 is configured so that a rigid body within the low-pressure area, i.e., the anode diffusion layer 5, is broader than a high-pressure-applying region, i.e., an area within the cathode seal 10. That is, positions of the anode-side space 20 and the cathode-side space 21 are different.

For the above reason, even when a high pressure is applied to the electrolyte membrane 2, the pressure can be received by the anode diffusion layer 5 having nigh rigidity and present at the low-pressure side. Accordingly, the electrolyte membrane 2 does not receive any bending force and shearing force that can cause breakage of the electrolyte membrane 2. Therefore, it is proposed that the electrolyte membrane 2 can safely be supported even if a substantial difference in the pressures is present.

SUMMARY

However, according to the above structure, a part that is effectively employed for compressing a hydrogen gas is only the part of the cathode electrode layer 4, and, the part of the anode diffusion layer 5, which extends more outward than the cathode diffusion layer 6, cannot be effectively employed therefor. Thus, the part will be a useless part while a sintered metal compact of Ti, which is expensive, is used for the diffusion layer.

Hence, the above issue is a problem to be solved in order to reduce costs for production of hydrogen pumps.

Furthermore, according to the above structure, it has been revealed that a performance problem is caused due to the presence of the cathode-side space 21 at the high-pressure side and the anode-side space 20 at the low-pressure side. That is, there is a problem, in which, when the power-generation stack is operated as a hydrogen pump, a portion of the high-pressure hydrogen gas is diffused reversely to the anode-side space 20 at the low-pressure side from the cathode-side space 21 at the high-pressure side, and the intentionally-increased pressure of the hydrogen gas will be decreased due to such reverse diffusion. This means that it results in deterioration of efficiencies of a function as a hydrogen pump.

Thus, a purpose of this application is to provide an electrochemical hydrogen pump that makes it possible to arrange an area of the anode diffusion and an area of the cathode diffusion layer to be approximately equal so as not to cause any impediments to reductions in costs, and to simultaneously prevent breakage of the electrolyte membrane caused due to a substantial difference in the pressures, without causing any deterioration in the performance.

In order to achieve the above purpose, according to an aspect of the disclosure, provided is an electrochemical hydrogen pump, including: (i) an electrolyte membrane; (ii) an anode electrode layer and an anode diffusion layer that are provided at a first side of the electrolyte membrane; (iii) a cathode electrode layer and a cathode diffusion layer that are provided at a second (the other) side of the electrolyte membrane; (iv) an anode seal that has openings each surrounding the anode diffusion layer; (v) a cathode seal that has openings each surrounding the cathode diffusion layer; (vi) an anode separator that is placed on an outer side of the anode diffusion layer; and (vii) a cathode separator that is placed on an outer side of the cathode diffusion layer, wherein a first inclined surface is provided on a lateral surface of the anode diffusion layer or the cathode diffusion layer, a second inclined surface is provided on an inner surface of the anode seal or the cathode seal, the first inclined surface and the second inclined surface form an engaging plane, and the engaging plane is inclined with respect to the cathode electrode layer or the anode electrode layer.

According to the disclosure, the electrolyte, membrane 2 is not exposed to any gases since any anode-side spaces 20 between the anode diffusion layer 5 and the anode seal 9, and any cathode-side spaces 21 between the cathode diffusion layer 6 and the cathode seal 10 do not exist. Accordingly, any deterioration in the performance due to the concentration diffusion of hydrogen from the high-pressure side to the low-pressure side is sufficiently suppressed.

DESCRIPTION OF EMBODIMENTS

Figure 5:
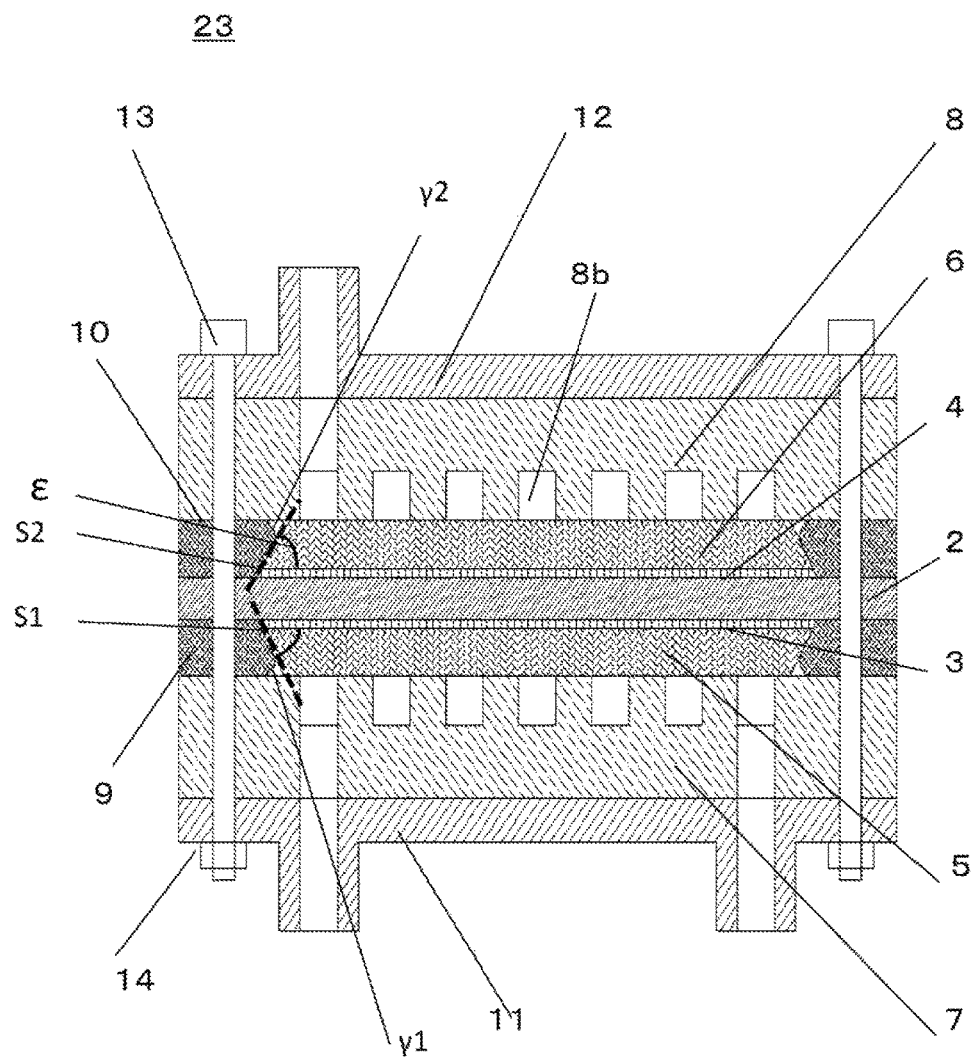
FIG. 5 is a schematic view that shows a cross-section of an electrochemical hydrogen, pump according to a first embodiment.

Hereinafter, embodiments of the disclosure will be described with reference to the drawings.
(First Embodiment)
FIG. 5 is a schematic view that shows a cross-section of the electrochemical hydrogen pump 23 according to the first embodiment.

<Overall Structure>
In the electrochemical hydrogen pump 23 according to the first embodiment, an electrolyte membrane 2, on both surfaces of which an anode electrode layer 3 and a cathode electrode layer 4 have been formed, is sandwiched by an anode diffusion layer 5 and a cathode diffusion layer 5, and then, is sandwiched by an anode separator 7 and a cathode separator 8. The resulting stack is further sandwiched by an anode insulation plate 11 and a cathode insulation plate 12, and then, the stack is fastened by bolts 13 and nuts 14. Furthermore, an anode seal 9 and a cathode seal 10 are attached onto the peripheries of the anode diffusion layer 5 and the cathode diffusion layer 6, respectively, in order to prevent the gas from leaking to the outside.

The electrolyte membrane 2 is a cation-permeable membrane. For example, Nafion (a registered trademark; manufactured by DuPont), and Aciplex (a tradename; manufactured by ASAHI KASEI CORPORATION) can be used therefor. For example, a anode electrode layer 3 including a RuIrFeOx catalyst may be provided on the anode-side surface of the electrolyte membrane 2, and a cathode electrode layer 4 including a platinum catalyst is provided on the cathode-side surface thereof.

Moreover, it is required that the anode diffusion layer 5 is tolerant of pressure from the electrolyte membrane 2 due to the high-pressure hydrogen gas passing through cathode flow channels 8b in the cathode separator 8. As examples of materials for the anode diffusion layer 5, electrically-conductive porous materials (e.g., porous materials obtained by platinizing surfaces of titanium-fiber or titanium-powder sintered compacts) can be mentioned.

Furthermore, as examples of materials for the cathode diffusion layer 6, highly-elastic graphitized carbon fibers (materials obtained through advanced graphitization of carbon fibers based on a high-temperature treatment at 2000° C. or higher), and high-elastic paper-shaped porous materials obtained by platinizing surfaces of titanium-powder sintered compacts can be mentioned.

Additionally, the anode seal 9 and the cathode seal 10 can be formed, for example, by compaction-molding of fluoro-rubbers. The anode separator 7 and the cathode separator 8 can be formed, for example, by subjecting a plate material made of SUS316L to a cutting process, thereby forming anode flow channels 8b or cathode flow channels, and the like thereon.

Figure 6A:
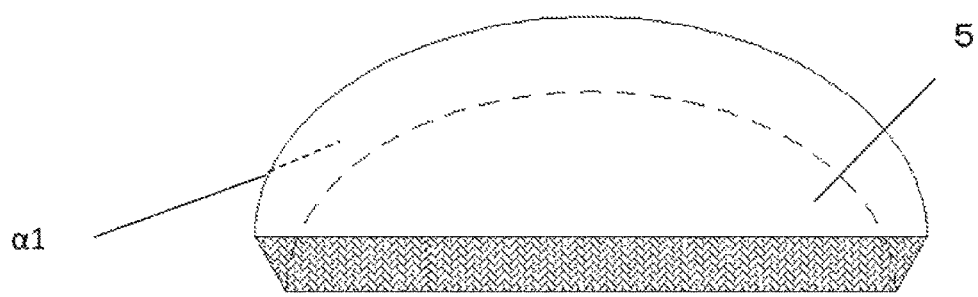
FIG. 6A is a perspective view that shows a cut piece of an anode diffusion layer in. the first embodiment.
Figure 6B:
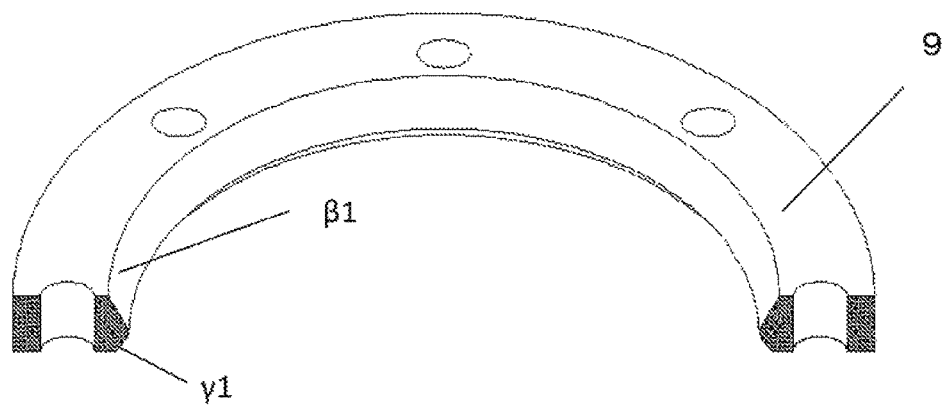
FIG. 6B is a perspective view that snows a cut piece of an anode seal in the first embodiment.

FIGS. 6A and 6B are perspective views that show cut pieces of the anode diffusion layer 5 and the anode seal 9, respectively.

As shown in FIG. 6A, a lateral surface of the anode diffusion layer 5 is referred to as a first inclined surface α1. As shown in FIG. 6B, an inner surface of the disk-shaped anode seal 9 may be configured by two curved surfaces, i.e. a second inclined surface β1 (the upper-side surface in FIG. 6B) and a third inclined surface γ1 (the lower-side surface in FIG. 6B).

Figure 7A:
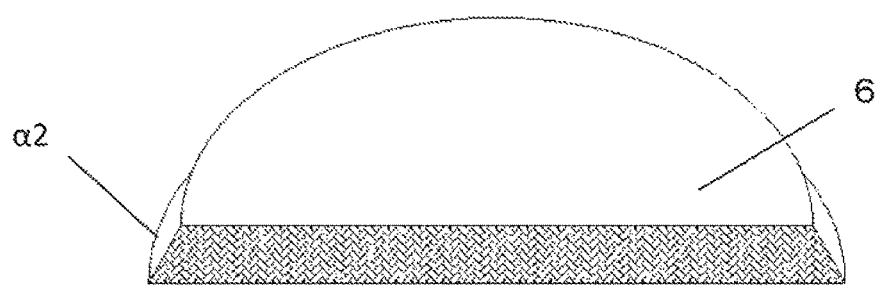
FIG. 7A is a perspective view that shows a cut piece of a cathode diffusion layer in the first embodiment.
Figure 7B:
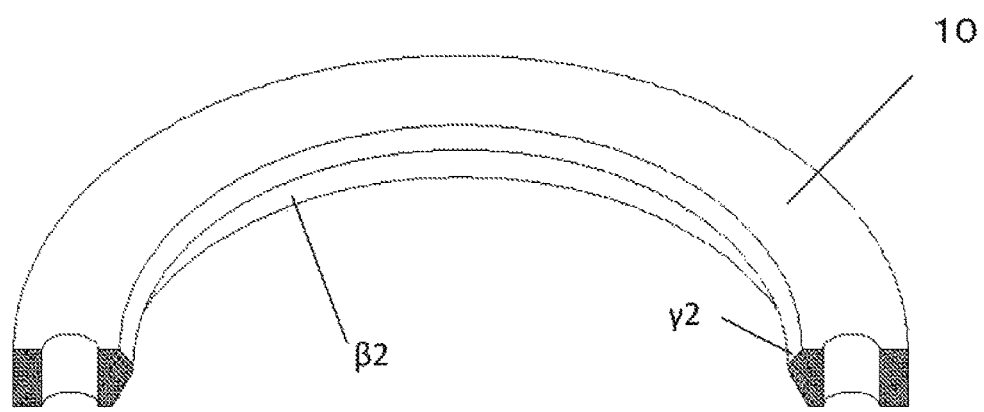
FIG. 7B is a perspective view that shows a cut piece of a cathode seal in the first embodiment.

FIGS. 7A and 7B are perspective views that show cut pieces of the cathode seal 10 and the cathode diffusion layer 6, respectively.

In the same manner, as shown in FIG. 7A, a lateral surface of the cathode diffusion layer 6 is referred to as a first inclined surface α2. An inner surface of the disk-shaped cathode seal 10 may be configured by two curved surfaces, i.e. a second inclined surface β2 (the lower-side surface in FIG. 7B) and a third inclined surface γ2 (the upper-side surface in FIG. 7B).

In addition, the lateral surface of the anode diffusion layer 5 and the inner surfaces(s) of the anode seal 9 are preferably inclined. In other words, preferably, an engaging plane S1 where these components are engaged is not vertical but inclined with respect to the plane surface of the electrolyte membrane 2 (electrode layer).

In the same manner, the lateral surface of the cathode diffusion layer 6 and the inner surface(s) of the cathode seal 10 are preferably inclined. In other words, preferably, an engaging plane S2 where these components are engaged is not vertical but inclined with respect to the plane surface of the electrolyte membrane 2 (electrode layer).

Figure 1:
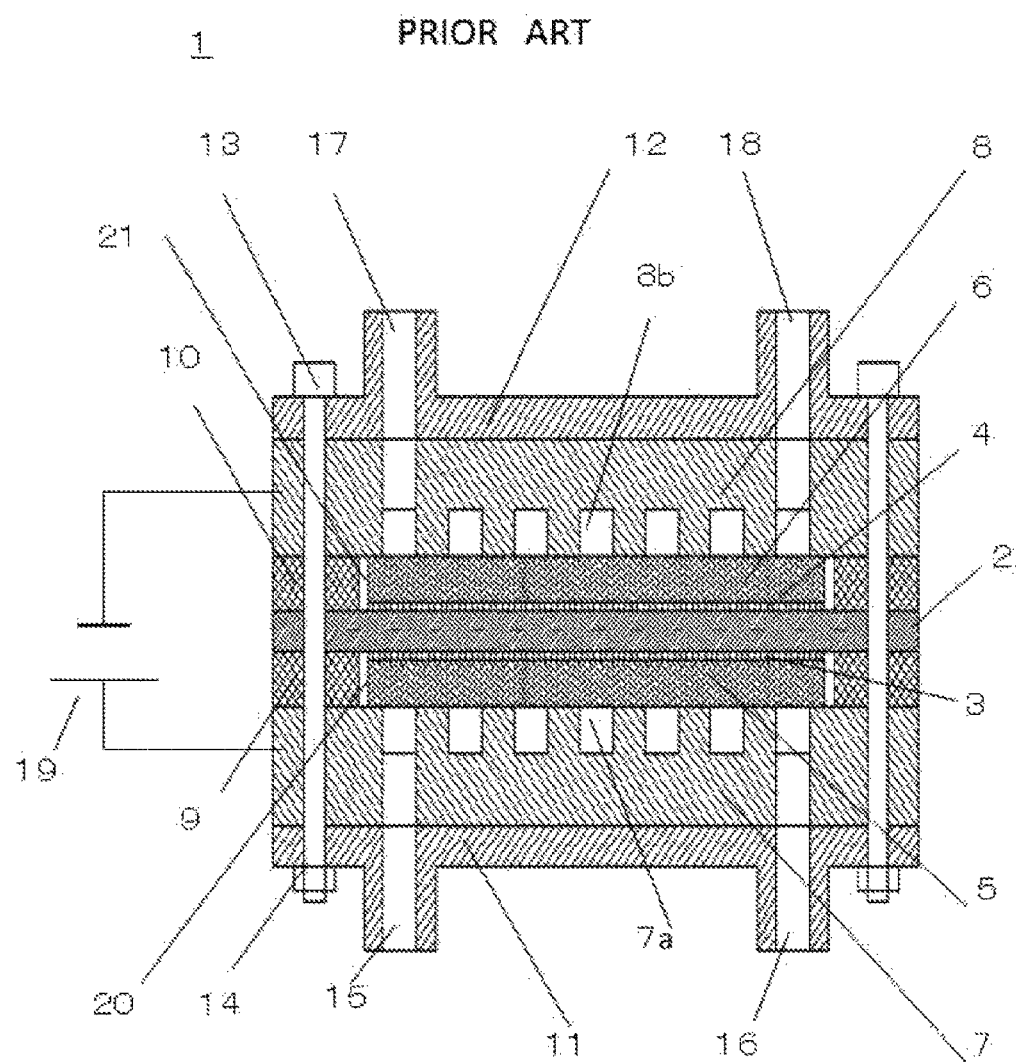
FIG. 1 is a schematic view that shows a cross-section of a general structure of a conventional power-generation stack in a fuel cell.
Figure 2A:
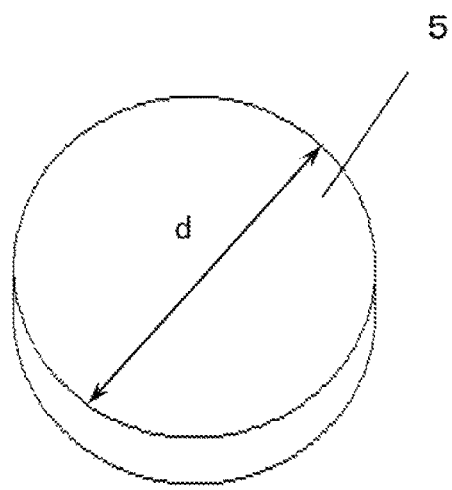
FIG. 2A is a perspective view that stereographically shows an anode diffusion layer in Patent Literature 1.
Figure 2B:
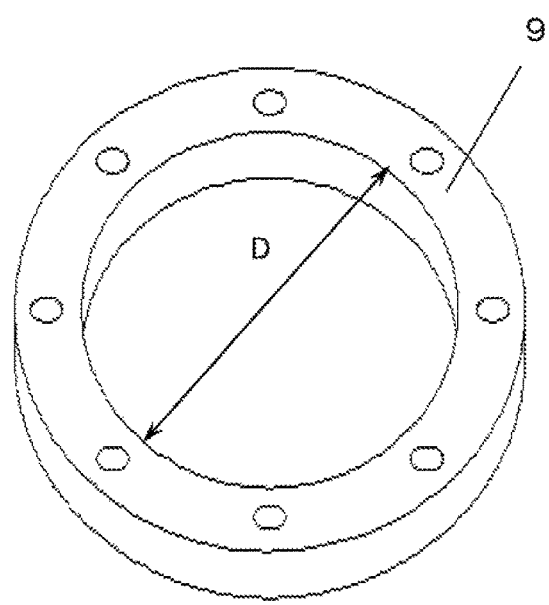
FIG. 2B is a perspective view that stereographically shows an anode seal in Patent Literature 1.
Figure 3:
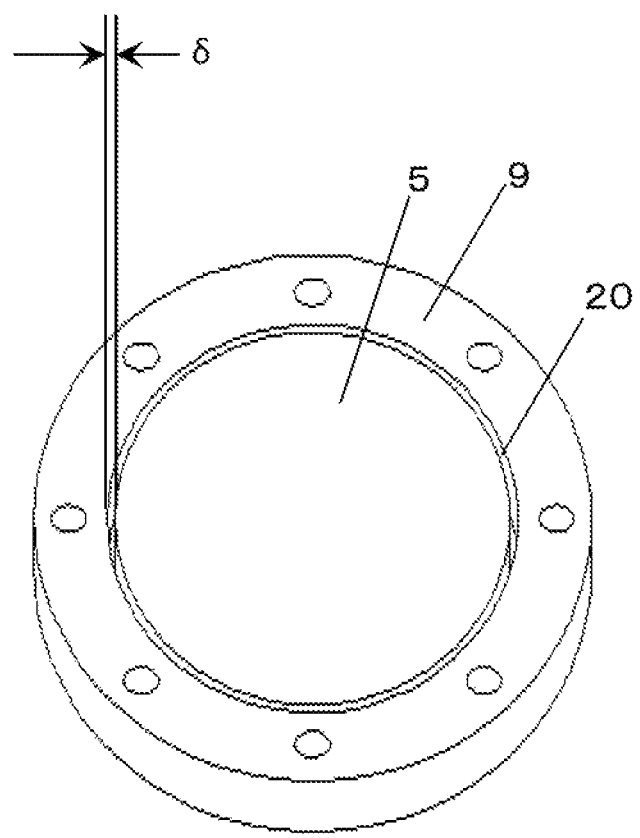
FIG. 3 is a perspective view that stereographically shows the combined anode diffusion layer and anode seal in Patent Literature 1.

Based on the above structure, no anode-side space 20 and cathode-side space 21 as shown in FIG. 1 will be formed.

Angles ε between the engaging planes S1/S2 and the cathode/anode electrode layers 4/3, respectively, are preferably smaller than 90 degrees.

A preferable range for the angles ε is 45±30 degrees. A more preferably range therefor is 45±20 degrees.

Additionally, the third inclined surfaces γ1 and γ2 are provided in such a manner that the first inclined surfaces α1 and α2 easily come into contact with the second inclined surfaces β1 and β2, respectively. In order to cause the first inclined surfaces α1 and α2 to come into close contact with the second inclined surfaces β1 and β2, respectively, it is required that the anode seal 9 and the cathode seal 10 are compressed toward the layered direction. The anode and cathode seals 9 and 10 can be stored in respective spaces that have been formed by the third inclined surfaces γ1 and γ2, by their compressed volumes.

Accordingly, compared with cases where such spaces are not present, the first inclined surfaces α1 and α2 and the second inclined surfaces β1 and β2, respectively, can be caused to come into close contact with each other based on smaller compression forces.

Furthermore, as described below, the anode seal 9 and the cathode seal 10 are provided to become deformed by compression during assembly of the components. The third inclined surfaces γ1 and γ2 are elements different from the second inclined surfaces β1 and β2, and, in particular, differ from them in terms of inclination angles. As alternatives to or together with the third inclined surfaces γ1 and γ2, fourth inclined surfaces may be provided on lateral surfaces of the anode diffusion layer 5 and the cathode diffusion layer 6 besides the first inclined surfaces.

In addition, in the above example, the first, second and third inclined surfaces correspond to certain parts of the lateral surfaces of the circular truncated cones.

<Stacking Procedures>

Figure 8:
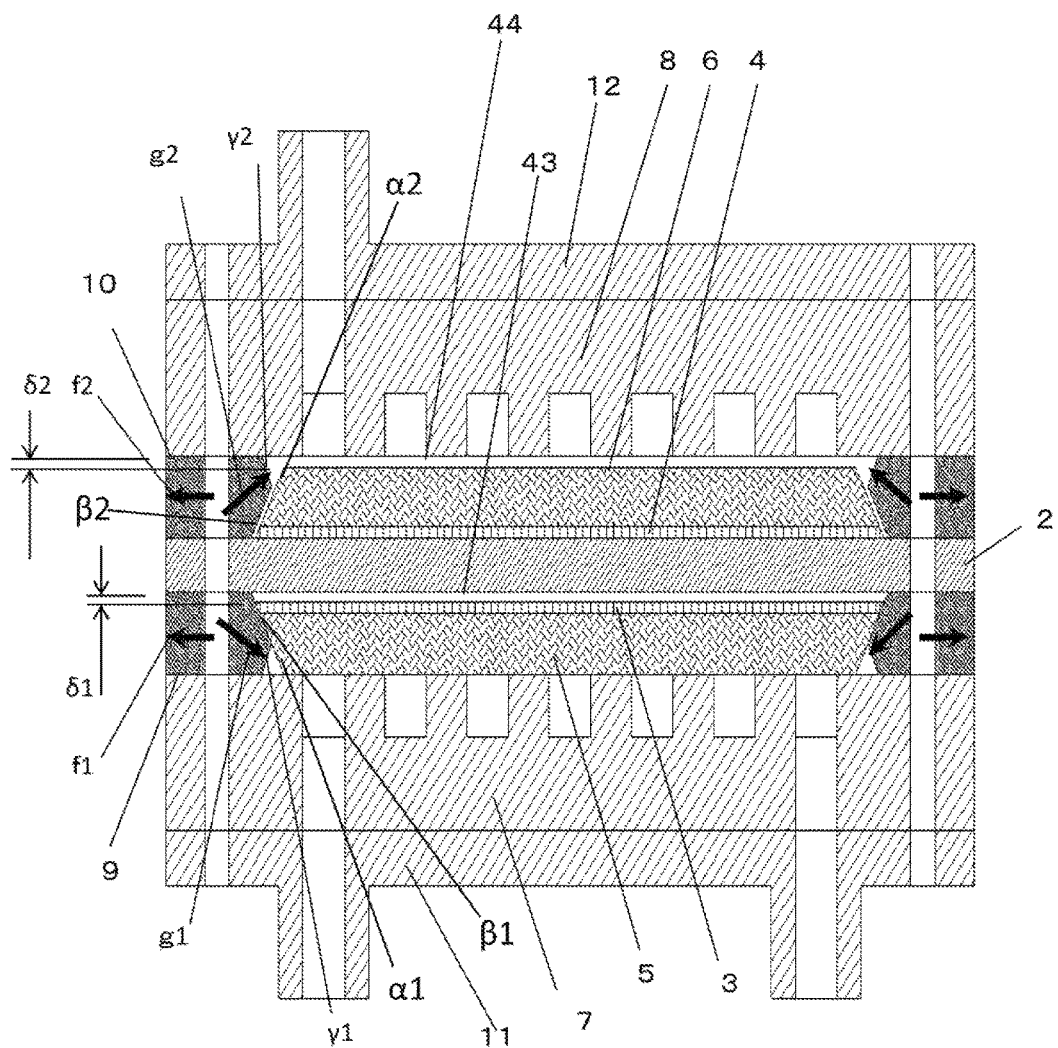
FIG. 8 is a schematic view that shows a cross-section of the electrochemical hydrogen pump according to the first embodiment in a pre-compressed state.

Procedures for stacking the components will now be described. At first, assembly of stacks at the anode side may be carried out. As shown in FIG. 8, an anode insulation plate 11 is placed on an assembly platform (not shown in the figure). An anode separator 7 is then placed on the anode insulation plate 11 (the upper direction in the figure). A ring-shaped anode seal 9 is further placed on the anode separator 7, and then, an anode diffusion layer 5 is placed thereon such that the second inclined surfaces β1 of the anode seal 9 engages with the first inclined surface α1 of the anode diffusion layer 5. Then, an electrolyte membrane 2, on surfaces of which an anode electrode layer 3 and a cathode electrode layer 4 have been formed by way of coating, is placed thereon. Subsequently, an assembling step for the cathode side is carried out. At first, a cathode diffusion layer 6 is placed on the electrolyte membrane 2. Then, a ring-shaped cathode seal 10 is further placed thereon such that the first inclined surface α2 of the cathode diffusion layer 6 engages with the second inclined surface β2 of the inner surface of the cathode seal 10. Furthermore, a cathode separator 8 and a cathode insulation plate 12 are placed thereon in this order.

<Compression Step>

Next, the above stack together with the assembly platform (not shown in the figures) is mounted in a pressing machine (not shown in the figures), and a compression force is applied to the stack by way of pressing the cathode insulation 12 to the downward direction, i.e., toward the assembly platform. FIG. 8 shows a state in which compression force is not applied to the stack, and therefore, the thickness of the anode seal 9 is larger than the thickness of the anode diffusion layer 5 by δ1. In the same manner, the thickness of the cathode seal 10 is larger than the thickness of the cathode diffusion layer 6 by δ2.

As a compression force is gradually applied to the stack from the above state, the anode seal 9 will elastically be deformed so as to reduce the thickness, and thus, by its deformation volume, the anode seal 9 will change the shape toward the direction to the lateral surface of the anode seal 9 (the direction shown by arrow f1) and toward the direction to the third inclined surface γ1 (present in the lower side in the figure) of the anode seal 9 (the direction shown by arrow g1). In that case, the first inclined surface α1 of the anode diffusion layer 5 is pressed increasingly firmly against the second inclined surface β1 of the ring-shaped anode seal 9. Thus, the anode seal 9 is elastically deformed due to the compressing force, and therefore, a space 43 that has been formed by the electrolyte membrane 2, the anode electrode layer 3, and the second inclined surface (inner edge face) β1 of the anode seal 9 can be caused to disappear.

In the same manner, the cathode seal 10 will elastically be deformed due to the compression force so as to reduce the thickness, and thus, by its deformation volume, the cathode seal 10 will change the shape toward the direction to the lateral surface of the cathode seal 10 (the direction shown by arrow f2) and toward the direction to the third inclined surface γ2 of the cathode seal 10 (the direction shown by arrow g2). Based on such elastic deformation of the cathode seal 10, a space 44 that has been formed by the cathode diffusion layer 6, the cathode seal 10, and the cathode separator 8 can be caused to disappear.

Thus, since there is no anode-side space 20 and cathode-side space 21 in the electrochemical hydrogen pump according to the embodiment, the electrolyte membrane 2 will never be exposed to the gas. Accordingly, a deterioration in the performance caused from the concentration diffusion of the hydrogen from the high-pressure side to the low-pressure side will be suppressed.

<Evaluation Apparatus>

Figure 9:
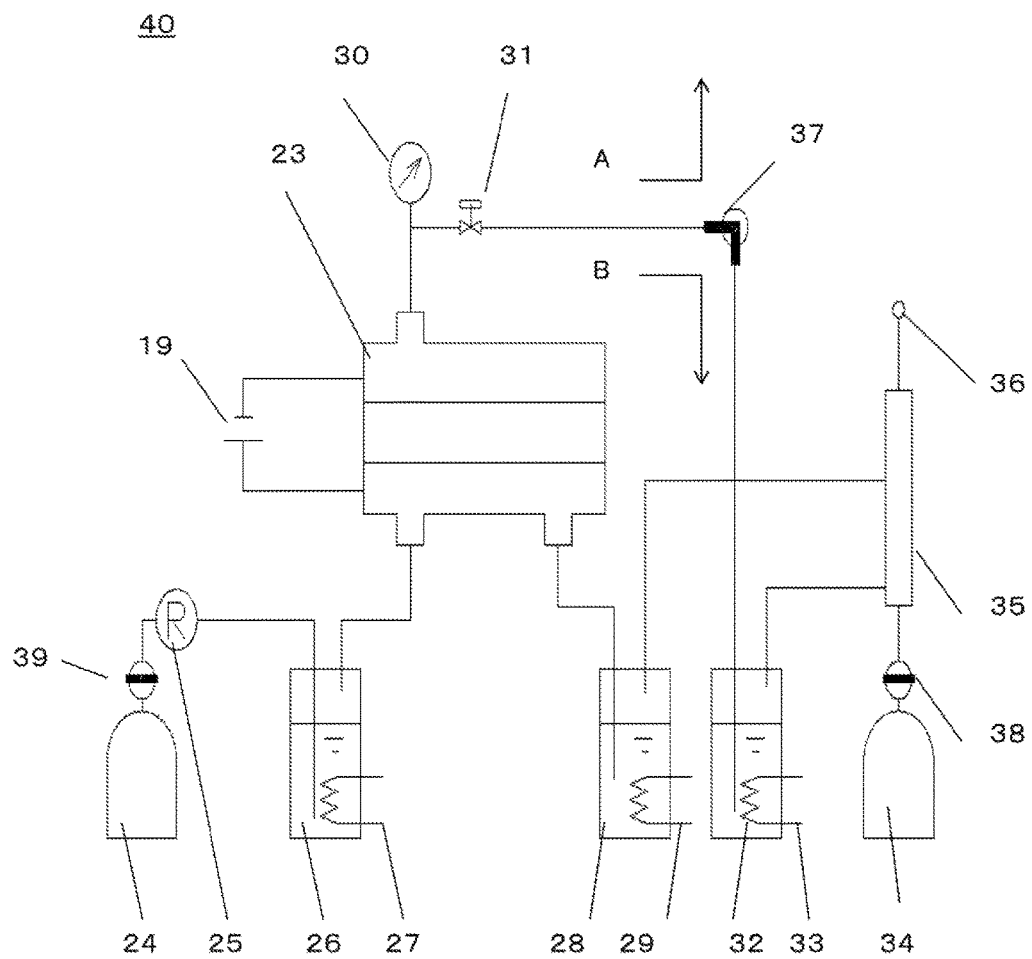
FIG. 9 is a schematic view that shows a cross-section of an apparatus for evaluating an electrochemical hydrogen pump.

FIG. 9 is a schematic view that shows a cross-section of an apparatus 40 for evaluating an electrochemical hydrogen pump 23. An electric current is applied to the electrochemical hydrogen pump 23 from a voltage-applying unit 19, and a low-pressure hydrogen gas is supplied to the electrochemical hydrogen pump 23 from a hydrogen cylinder 24 by a regulator 25. The low-pressure hydrogen gas is humidified by a bubbler 26 and a heater 27. A dew point of a surplus hydrogen gas that has not been utilized in the electrochemical hydrogen pump 23 is lowered by a gas-liquid separator 28 and a cooler 29. Furthermore, the pressure at the high-pressure side is measured by a pressure gauge 30, and an exhaust valve 31 that is present downstream of the pressure gauge 30 is closed during normal operation, and is opened when the pressure reaches or is above a given threshold.

However, a degree of opening of the exhaust valve 31 is adjusted so as to generate a sufficient pressure loss. That is, the degree of opening of the exhaust valve 31 is adjusted such that a pressure of the hydrogen gas that has passed through the exhaust valve 31 is descried almost to atmospheric pressure (about 1.1 times larger than the atmospheric pressure) due to the loss of pressure caused in the exhaust valve 31.

A dew point of the hydrogen gas that has been depressurized almost to the atmospheric pressure is lowered by a gas-liquid separator 32 and a cooler 33, is then diluted by a nitrogen gas supplied from a nitrogen cylinder 34, inside a gas-dilution device 35, and then, is flown out from an exhaust outlet 36 leading to the outside.

Additionally, the process described below was carried out under conditions where the heater 27 was set to 65° C., and the coolers 29 and 33 were set to 20° C.

<Evaluation Process>

A process for evaluating a hydrogen pump according to the disclosure will now be described.

i) As shown in FIG. 9, the electrochemical hydrogen pump 23 according to the first embodiment is connected to the evaluation apparatus.

ii) A three-way valve 37 is switched to a closed side (arrow B) from an atmosphere-releasing position (arrow A).

iii) A valve 38 for the nitrogen cylinder for the gas dilution is manipulated so as to cause the nitrogen to pass through the gas-dilution device 35.

iv) The valve 39 and the regulator 25 for the hydrogen cylinder 24 are manipulated so as to supply a hydrogen gas having a pressure of 1.1 MPa to the electrochemical hydrogen pump 23.

v) The voltage-applying unit 19 is switched on, and a current value is set so as to secure a value of 1.0 A/cm$^2$ based on calculation from areas of electrode layers.

vi) the current is continuously applied to the electromechanical hydrogen pump 23 for 5 minutes. After 5 minutes, a value indicated by the pressure gauge 30 is recorded.

vii) the voltage-applying unit 19 is switched off, the supply of the hydrogen gas is terminated, and then, the supply of the nitrogen gas for the gas dilution is terminated, based on manipulation of the valves.

viii) finally, the three-way valve 37 is switched to the atmosphere-releasing side (arrow A) from the closed position (arrow B).

ix) the above steps (i) to (viii) are repeated 50 times (50 cycles).

x) the electrochemical hydrogen pump 23 according to the first embodiment is detached from the evaluation apparatus.

<Evaluation Results>

Figure 10:
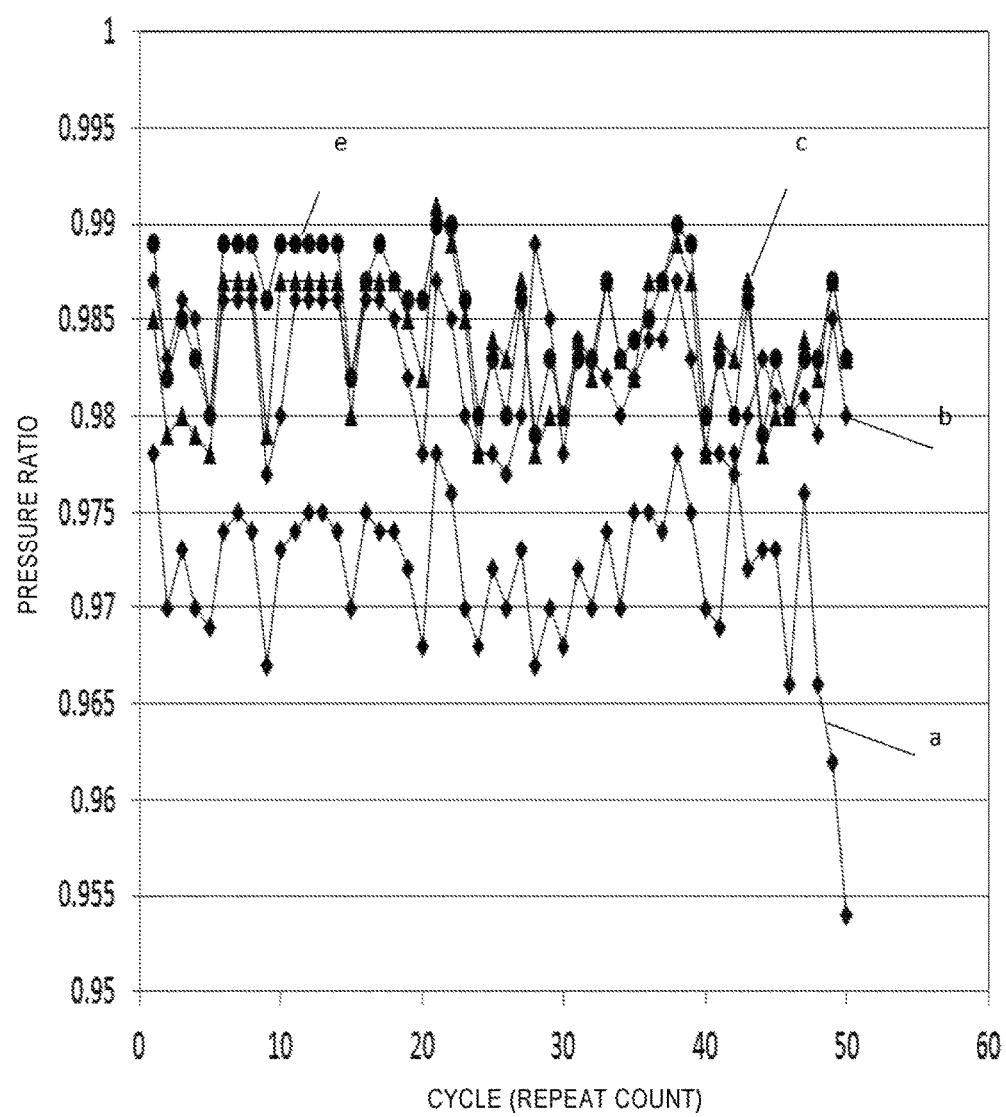
FIG. 10 is a diagram that shows results of evaluations on the electrochemical hydrogen pump in Patent Literature 1, and electrochemical hydrogen pumps according to first to third embodiments, based on the apparatus for evaluating an electrochemical hydrogen pump in FIG. 9.

In FIG. 10, a polygonal line a refers to a line pattern that is obtained by plotting results of the electrochemical hydrogen pump 22 disclosed in Patent Literature 1 where the plots show cycles of the above process along the abscissa and pressure ratios at the respective cycles along the ordinate.

In FIG. 10, a polygonal line b refers to a line pattern that is obtained by plotting results of the electrochemical hydrogen pump 23 according to the first embodiment of the disclosure where the plots show cycles of the above process along the abscissa and pressure ratios at the respective cycles along the ordinate.

With regards to the polygonal line b, although slight variations are observed in the course of the first to fiftieth cycles, almost all of the pressure ratios range from 0.98 to 0.99. On the other hand, with regards to the polygonal line a, the pressure ratios are smaller than those of the polygonal line b from the first cycle by about 0.01 point, and rapidly decrease near the fiftieth cycle.

Figure 4:
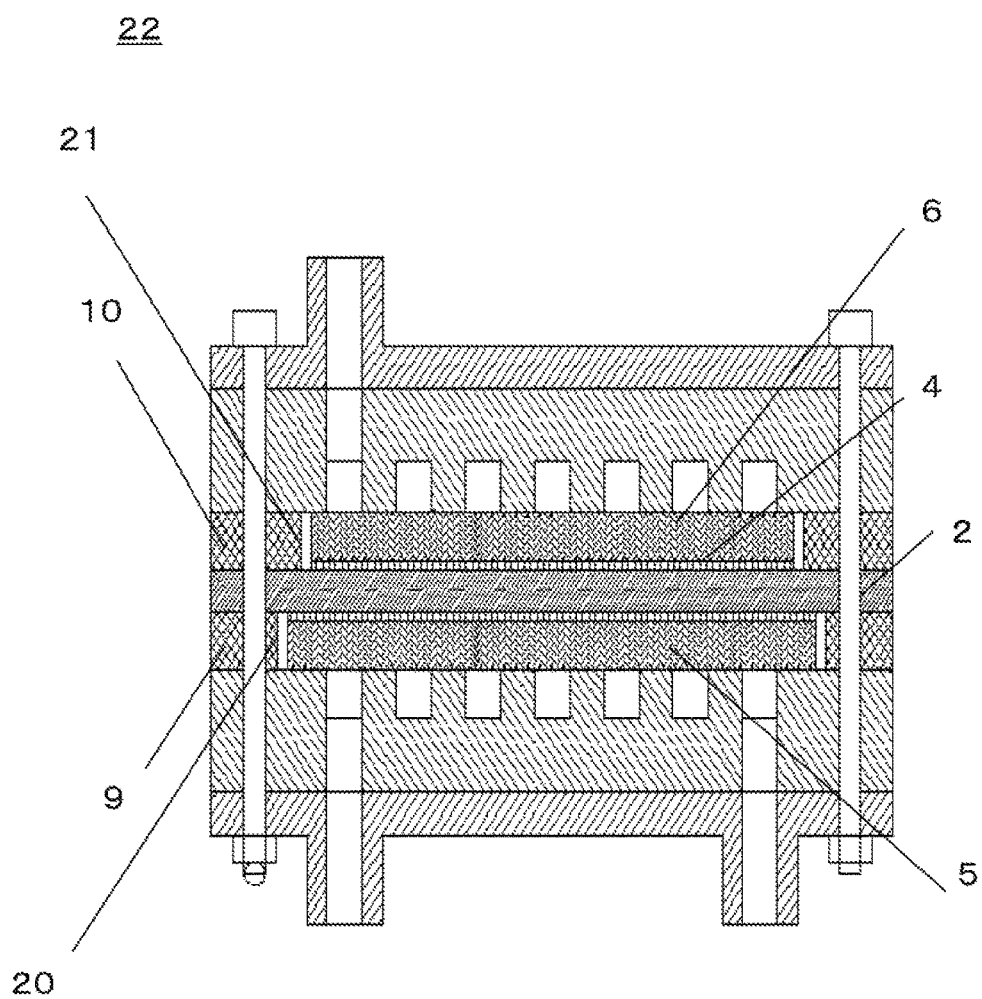
FIG. 4 is a schematic view that shows a cross-section of the electrochemical hydrogen, pump disclosed in WO2015/020065.

A reason why the pressure ratios in the polygonal line a are lower from the first cycle is considered as follows: a concentration diffusion of hydrogen is caused toward the direction from the cathode-side space 21 to the anode-side space 20 in the electrochemical hydrogen pump in FIG. 4, which is disclosed in Patent Literature 1.

Furthermore, a reason why the pressure ratios rapidly decrease near the fiftieth cycle in the polygonal line a is considered as follows: a combustion reaction between hydrogen that has passed through the electrolyte membrane 2 and oxygen in the air remained in the cathode flow channels 8b in the cathode-side separator is caused at the early stage of current application at each cycle in the vicinity of the cathode-side space 21, and thus, the electrolyte membrane 2 is gradually damaged.

To the contrary, the pressure ratios are almost constant from the first to fiftieth cycles, and any deterioration in the compression efficiency is not caused in the polygonal line b corresponding to the first embodiment of the disclosure.

Accordingly, there are no sites where the electrolyte membrane 2 is exposed to the gas (e.g., sites such as the cathode-side space 21 and the anode-side space 20 (FIG. 1). As a result, it is considered that reverse diffusion of hydrogen, and damages of the electrolyte membrane 2 are difficult to occur.

In addition, polygonal lines c and d refer to data with regards to the second embodiment, and will be described below.

(Second Embodiment)

Figure 11:
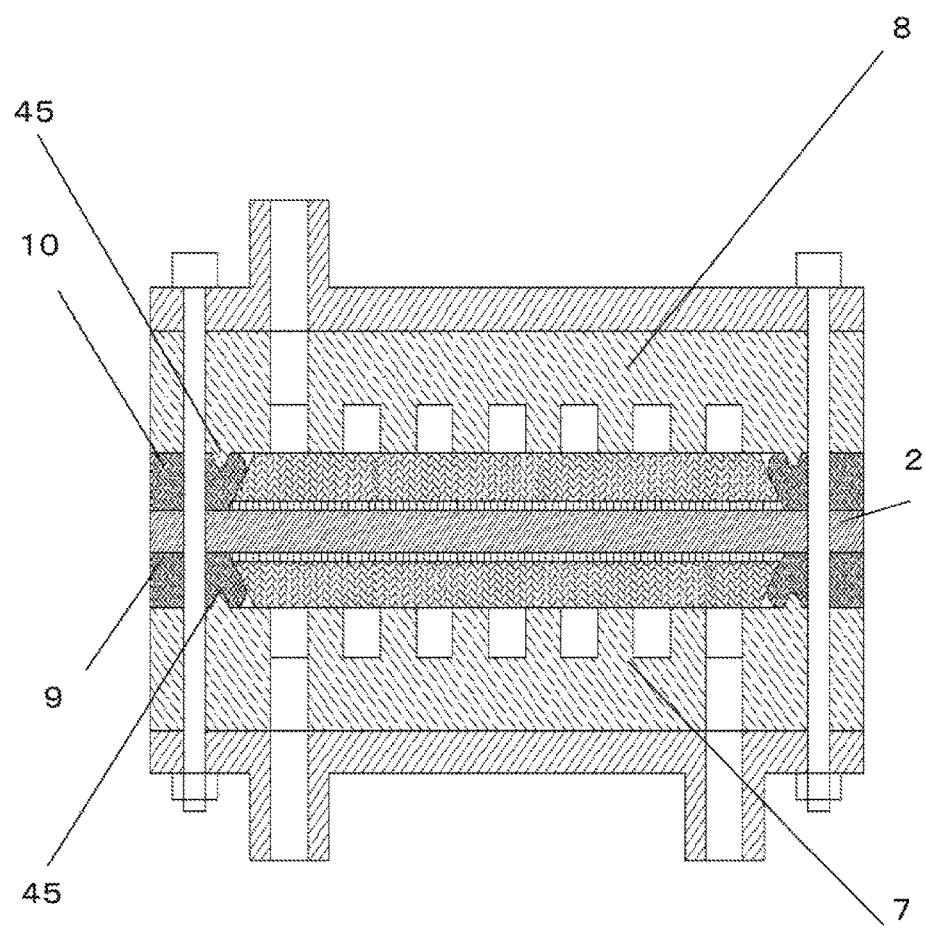
FIG. 11 is a schematic view that shows a cross-section of an electrochemical hydrogen pump according to a second embodiment.

FIG. 11 is a schematic view that shows a cross-section of the electrochemical hydrogen pump 41 according to the second embodiment.

<Overall Structure>

A difference between the electrochemical hydrogen pump 41 according to the second embodiment and the electrochemical hydrogen pump 23 according to the first embodiment is that there are first lugs 45 on an anode separator 7 and a cathode separator 8. Matters not mentioned herein are the same as those in the first embodiment.

That is, the first lugs 45 are provide don the node separator 7 and the cathode separator 8 so as to form a structure in which the fist lugs 45 locally fix the anode seal 9 and the cathode seal 10 when the components are assembled.

Accordingly, a lateral surface α1 of the anode diffusion layer 5 and an inner surface β1 of the anode seal 9, and a lateral surface α2 of the cathode diffusion layer 6 and an inner surface β2 of the cathode seal 10, respectively, can be brought into close and rigid contact with each other.

<Evaluations>

In FIG. 10, a polygonal line c refers to a line pattern that is obtained by plotting the cycles of the above process along the abscissa and the respective pressure ratios that were obtained with respect to the electrochemical hydrogen pump 41 according to the second embodiment of the disclosure based on the above-described evaluation process, along the ordinate.

According to the polygonal line c in FIG. 10, although slight variations are observed in the course of the first to fiftieth cycles with respect to the electrochemical hydrogen pump 41 in the second embodiment of the disclosure, almost all of the pressure ratios range from 0.98 to 0.99, and thus, any deterioration in the compression efficiency is not caused.

Accordingly, there are no sites where the electrolyte membrane 2 is exposed to the gas (e.g., sites such as the cathode-side space 21 and the anode-side space 20 in the electrochemical hydrogen pump 22 in Patent Literature 1).

Therefore, it is considered that reverse diffusion of hydrogen, and damages of the electrolyte membrane 2 are difficult to occur.

(Third Embodiment)

Figure 12:
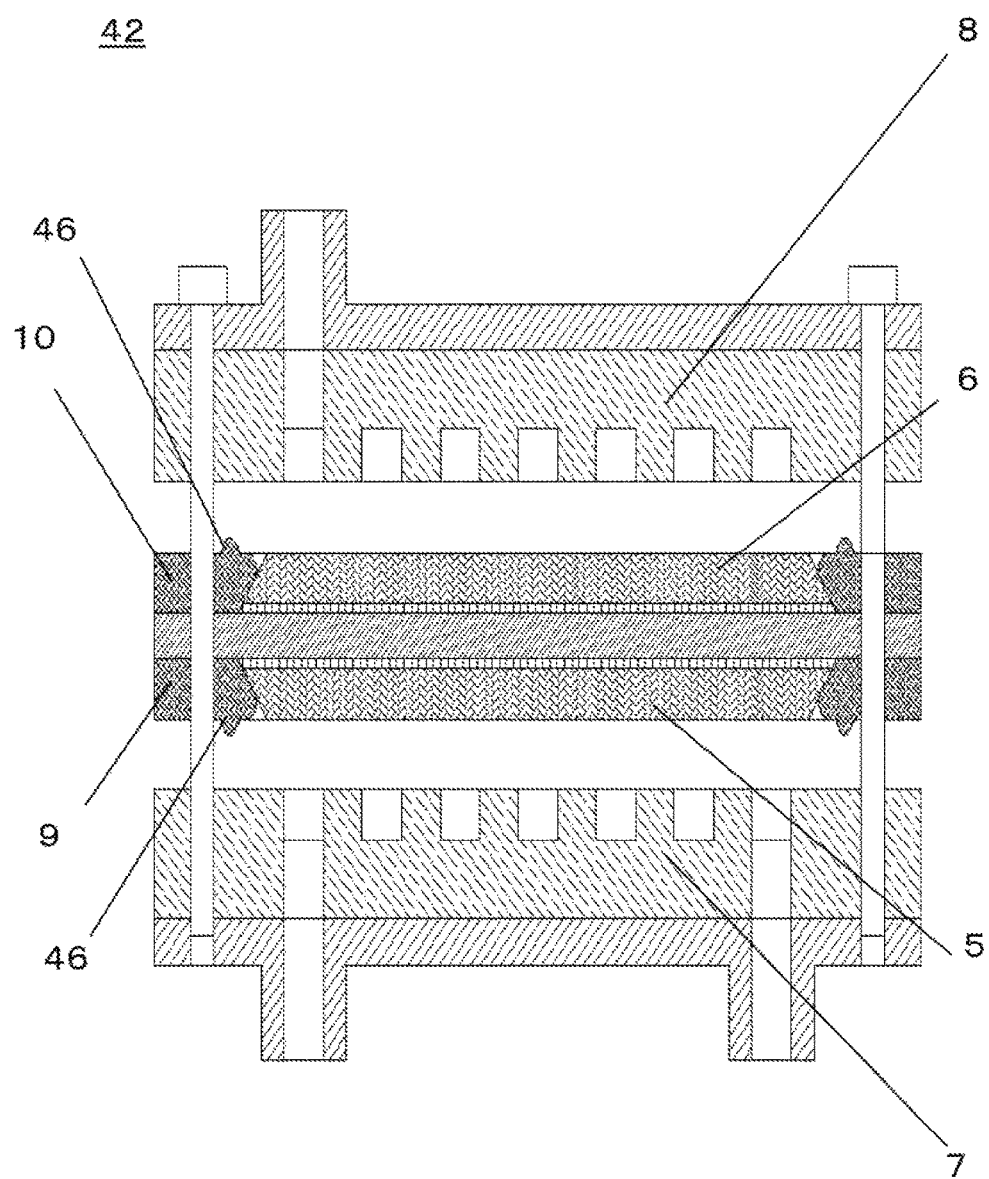
FIG. 12 is a schematic view that shows a cross-section of an electrochemical hydrogen pump according to a third embodiment in a state before the stack is bolted.

FIG. 12 is a schematic view that shows a cross-section of the electrochemical hydrogen pump 42 according to the third embodiment before the stack is bolted.

<Overall Structure>

A difference between the electrochemical hydrogen pump 32 according to the third embodiment and the electrochemical hydrogen pump 41 according to the first embodiment is that there are second lugs 46 on the anode seal 9 and the cathode seal 10. Matters not mentioned herein are the same as those in the first embodiment.

That is, the second lugs 46 are provided on the anode seal 9 and the cathode seal 10 so as to form a structure in which the second lugs 46 locally fix the anode separator 7 and the cathode separator 8 when the components are assembled. Accordingly, a lateral surface of the anode diffusion layer 5 and an inner surface of the anode seal 9, and a lateral surface of the cathode diffusion layer 6 and an inner surface of the cathode seal 10, respectively, can be brought into close and rigid contact with each other.

<Evaluations>

In FIG. 10, a polygonal line e refers to a line pattern that is obtained by plotting the cycles of the above process along the abscissa and the respective pressure ratios that were obtained with respect to the electrochemical hydrogen pump 42 according to the third embodiment based on the above-described evaluation process, along the ordinate.

According to the polygonal line e in FIG. 10, although slight variations are observed in the course of the first to fiftieth cycles with respect to the electrochemical hydrogen pump 42 in the third embodiment of the disclosure, almost all of the pressure ratios range from 0.98 to 0.99, and thus, any deterioration in the compression efficiency is not caused.

Accordingly, there are no sites where the electrolyte membrane 2 is exposed to the gas (e.g., sites such as the cathode-side space 21 and the anode-side space 20 in the electrochemical hydrogen pump 22 in Patent Literature 1). Therefore, it is considered that reverse diffusion of hydrogen, and damages of the electrolyte membrane 2 are difficult to occur.

(Effects)

In addition, in an electrochemical hydrogen pump according to the disclosure, an anode seal and a cathode seal are placed so as to be pressed against an anode diffusion layer and a cathode diffusion layer, respectively, based on their inclined surfaces that serves as engaging planes. Accordingly, these components can be brought into close contact with each other in such a manner that any spaces are not caused between the anode diffusion layer and the anode seal and between the cathode diffusion layer and the cathode seal. As a result, since any spaces are not present between the diffusion layers and the seals, and thus, the electrolyte membrane is not exposed to the gas, a deterioration in the performance due to concentration diffusion of hydrogen from the high-pressure side to the low-pressure side is suppressed. Hence, the electrochemical hydrogen pump according to the disclosure is suitable as a hydrogen-compressing apparatus that can serve as a household small-sized hydrogen-filling apparatus or the like.

Furthermore, it is not required that the anode diffusion layer 5 at the low-pressure side is enlarged so as to have a region that does not contribute to the reaction, and therefore, costs for the anode diffusion layer 5 that is formed of an expensive Ti sintered material can be reduced.

(Fourth Embodiment)

Figure 13:
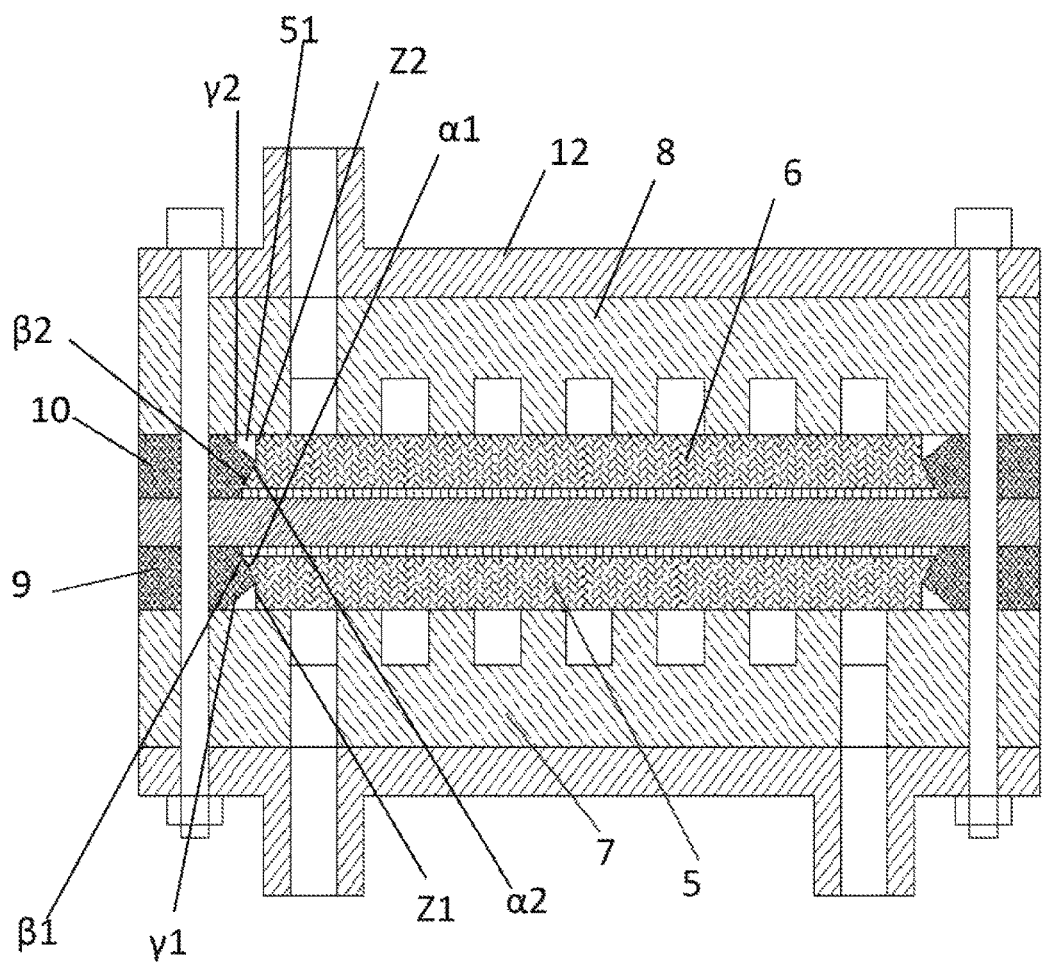
FIG. 13 is a schematic view that, shows a cross-section of an electrochemical hydrogen pump according to a fourth embodiment.

FIG. 13 is a schematic view that shows a cross-section of the electrochemical hydrogen pump 50 according to the fourth embodiment. FIG. 13 corresponds to FIG. 5, which corresponds to the first embodiment. Matters not mentioned in this embodiment are the same as those in the first embodiment.

Differences between the electrochemical hydrogen pump 50 according to the fourth embodiment and the electrochemical hydrogen pump 23 according to the first embodiment can be found in a structure of a connecting part between the cathode seal 10 and the cathode diffusion layer 6, and also, in structure of a connecting part between the anode seal 9 and the anode diffusion layer 5.

A fourth inclined surface Z2 is provided on an upper part of a lateral surface of the cathode diffusion layer 6 (i.e. the upper part is adjacent to the cathode separator 8).

The inclination direction of the fourth inclined surface Z2 is vertical to the planar surfaces of the electrolyte membrane 2 (electrode layer). That is, the inclination direction of fourth inclined surface Z2 is more vertical to planar surfaces the electrolyte membrane 2 (electrode layer), compared with the second included surface $\alpha 2$.

An area of contact between the cathode diffusion layer 6, on which the fourth inclined surface Z2 is formed besides the first inclined surface $\alpha 2$, and the cathode separator 8 is larger than an area of contact between a cathode diffusion layer 6 on which not the fourth inclined surface Z2 but only the first inclined surface $\alpha 2$ is formed, and a cathode separator 8. Accordingly, the contact resistance between both the components in this embodiment becomes smaller, and thus, the IR loss can be reduced. As a result, the power efficiency can be improved. The same shall apply to the anode side. Thus, the power efficiency can be promoted so as to secure a high-pressure hydrogen gas.

In addition, an inclination angle of the fourth inclined surface Z2 is 90° (i.e., vertical) with respect to the planar surfaces of the electrolyte membrane 2 (electrode layer) at a maximum. If the inclination angle exceeds 90°, it may be difficult to build the electrochemical hydrogen pump 50.

(Throughout all the Embodiments)

The first to fourth embodiments can be combined. for example, the cathode-side structure in the first embodiment can be combined with the anode-side structure in the second embodiment.

Additionally, although the idea of the disclosure is applied to both the anode-side and cathode-side structures in the above-described embodiments, the idea can be applied only to either one of the cathode-side and anode-side structures.

An electrochemical hydrogen pump according to the disclosure can be employed as a hydrogen gas-compressing apparatus that serves as a device for filling hydrogen into a fuel cell mounted in vehicles and the like.

What is claimed is:

1. An electrochemical hydrogen pump, comprising:
   (i) an electrolyte membrane;
   (ii) an anode electrode layer and an anode diffusion layer that are provided at a first side of the electrolyte membrane;
   (iii) a cathode electrode layer and a cathode diffusion layer that are provided at a second side of the electrolyte membrane;
   (iv) an anode seal that has an opening surrounding the anode diffusion layer;
   (v) a cathode seal that has an opening surrounding the cathode diffusion layer;

(vi) an anode separator that is placed on an outer side of the anode diffusion layer; and (vii) a cathode separator that is placed on an outer side of the cathode diffusion layer, wherein a first inclined surface is provided on a lateral surface of the anode diffusion layer or the cathode diffusion layer, a second inclined surface is provided on an inner surface of the anode seal or the cathode seal, the first inclined surface and the second inclined surface form an engaging plane, the engaging plane is inclined with respect to the cathode electrode layer or the anode electrode layer, and a third inclined surface, which is inclined with respect to a main surface of the electrolyte membrane, is further provided on the inner surface of the anode seal or the cathode seal besides the second inclined surface.

2. The electrochemical hydrogen pump according to claim 1, wherein a fourth surface, which is more vertical to planar surfaces of the electrolyte membrane compared with the second inclined surface, is further provided on the lateral surface of the anode diffusion layer or the cathode diffusion layer besides the first inclined surface.

3. The electrochemical hydrogen pump according to claim 1, wherein the anode diffusion layer or the cathode diffusion layer is flat plate-shaped, and is placed in such a manner that a larger one of upper and lower surfaces of the anode diffusion layer or the cathode diffusion layer faces the electrolyte membrane, and the anode seal or the cathode seal is flat plate-shaped, and is placed in such a manner that either one of upper and lower sides of the anode seal or the cathode seal faces the electrolyte membrane, provided that the opening present on said either one of the upper and lower sides is larger than the opening present on the other side.

4. The electrochemical hydrogen pump according to claim 1, wherein the anode seal or the cathode seal has a thickness larger than a thickness of the anode diffusion layer or the cathode diffusion layer.

5. The electrochemical hydrogen pump according to claim 1, wherein a first lug is provided on the anode separator or the cathode separator so as to form a structure in which the first lug fixes the anode seal or the cathode seal.

6. The electrochemical hydrogen pump according to claim 1, wherein a second lug is provided on the cathode seal or the anode seal so as to form a structure in which the second lug fixes the anode separator or the cathode separator.

* * * * *